(12) United States Patent
Park et al.

(10) Patent No.: US 9,778,529 B2
(45) Date of Patent: Oct. 3, 2017

(54) IN-CELL TOUCH LIQUID CRYSTAL DISPLAY APPARATUS, METHOD OF MANUFACTURING THE SAME, METHOD OF MANUFACTURING THIN FILM TRANSISTOR ARRAY SUBSTRATE, AND METHOD OF MANUFACTURING COLOR FILTER ARRAY SUBSTRATE

(71) Applicant: LG Display Co., Ltd., Seoul (KR)

(72) Inventors: Yong Chan Park, Seoul (KR); Jin Seong Kim, Goyang-si (KR); Seung Kyeom Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/885,767

(22) Filed: Oct. 16, 2015

(65) Prior Publication Data

US 2016/0124280 A1    May 5, 2016

(30) Foreign Application Priority Data

Oct. 31, 2014  (KR) .................. 10-2014-0150667

(51) Int. Cl.
| | |
|---|---|
| *G02F 1/136* | (2006.01) |
| *G02F 1/1362* | (2006.01) |
| *G02F 1/1339* | (2006.01) |
| *G02F 1/1333* | (2006.01) |

(52) U.S. Cl.
CPC .... *G02F 1/136286* (2013.01); *G02F 1/13338* (2013.01); *G02F 1/13394* (2013.01)

(58) Field of Classification Search
CPC .......... G02F 1/136286; G02F 1/13338; G02F 1/133512; G02F 1/133514; G02F 1/13394; G02F 1/1368
See application file for complete search history.

(56) References Cited

U.S. PATENT DOCUMENTS

| | | | |
|---|---|---|---|
| 2010/0007632 A1* | 1/2010 | Yamazaki | H01L 27/3234 345/175 |
| 2010/0156827 A1* | 6/2010 | Joo | G02F 1/13338 345/173 |
| 2011/0102698 A1* | 5/2011 | Wang | G02F 1/13338 349/54 |
| 2013/0162570 A1* | 6/2013 | Shin | G06F 3/041 345/173 |

* cited by examiner

*Primary Examiner* — James Dudek
(74) *Attorney, Agent, or Firm* — Fenwick & West LLP

(57) ABSTRACT

Disclosed are an in-cell touch liquid crystal display (LCD) device based on a twisted nematic (TN) mode, a method of manufacturing the same, a method of manufacturing a thin film transistor (TFT) array substrate, and a method of manufacturing a color filter array substrate. The TFT array substrate includes a TFT disposed in a pixel area defined by an intersecting gate line and data line, a conductive line disposed on the TFT, and a transparent conductive layer in electrical contact with the conductive line. The color filter array substrate includes a light shield layer, a color filter, an overcoat layer covering the light shield layer and the color filter, a column spacer disposed on the overcoat layer, and a common electrode disposed on the overcoat layer and the column spacer, where the conductive line supplies the common electrode with a common voltage or a touch driving signal.

7 Claims, 10 Drawing Sheets

| Mask | Layer |
|---|---|
| 1 | gate |
| 2 | source / drain & active layer |
| 3 | buffer layer 1 & PAS 1 |
| 4 | buffer layer 2 & conductive line |
| 5 | PAS 2 |
| 6 | pixel electrode |

FIG. 13
| Mask | Layer |
|---|---|
| 1 | black matrix |
| 2 | color filter |
| 3 | overcoat |
| 4 | column spacer |
| 5 | common electrode |
| 6 | touch electrode |
FIG. 14
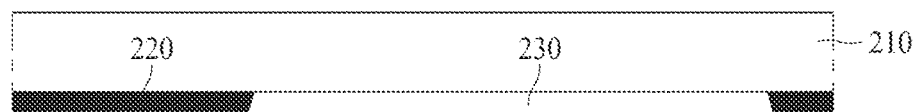
FIG. 15
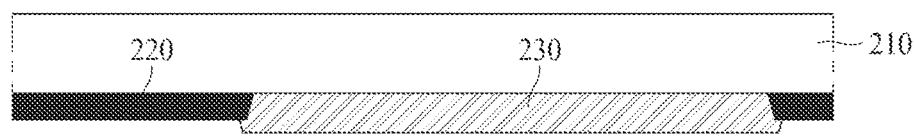

IN-CELL TOUCH LIQUID CRYSTAL DISPLAY APPARATUS, METHOD OF MANUFACTURING THE SAME, METHOD OF MANUFACTURING THIN FILM TRANSISTOR ARRAY SUBSTRATE, AND METHOD OF MANUFACTURING COLOR FILTER ARRAY SUBSTRATE

CROSS-REFERENCE TO RELATED APPLICATIONS

This application claims the benefit of the Korean Patent Application No. 10-2014-0150667 filed on Oct. 31, 2014, which is hereby incorporated by reference as if fully set forth herein.

BACKGROUND

Field of the Invention

The disclosed embodiments relate to an in-cell touch liquid crystal display (LCD) device based on a twisted nematic (TN) mode, a method of manufacturing the same, a method of manufacturing a thin film transistor (TFT) array substrate, and a method of manufacturing a color filter array substrate.

Discussion of the Related Art

As portable electronic devices (e.g., mobile phones, tablet personal computers (PCs), notebook computers) and display devices (e.g., monitors, televisions (TVs)) advance, the demand for applicable flat panel display (FPD) devices is increasing.

FPD devices include liquid crystal display (LCD) devices, plasma display panels (PDPs), field emission display (FED) devices, and organic light emitting display devices, for example.

Among FPD devices, LCD devices are increasing in popularity because the LCD devices are easily manufactured due to the advance of manufacturing technology and because LCD devices have an easily-driven driver, low power consumption, high image quality, and a large screen.

FIG. 1 is a diagram schematically illustrating a related art LCD device based on a twisted nematic (TN) mode. In FIG. 1, a backlight unit and a driving circuit unit are not illustrated.

Referring to FIG. 1, the related art LCD device based on the TN mode includes a thin film transistor (TFT) array substrate 10, a color filter array substrate 20, and a TN liquid crystal layer 30 disposed between the TFT array substrate 10 and the color filter array substrate 20.

The TFT array substrate 10 includes a TFT and a pixel 18, which are disposed over a first glass substrate 11. The TFT includes a gate electrode 12, a gate insulation layer 13, an active layer 14, a source electrode 15, and a drain electrode 16. The pixel electrode 18 is electrically connected to the drain electrode 16 and is disposed on a passivation layer 17.

The color filter array substrate 20 includes a second glass substrate 21, a light shield layer (a black matrix) 22 defining a pixel area, red, green, and blue color filters 23, an overcoat layer 24, a common electrode 25, and a color spacer 26.

The color spacer 26 is formed on the common electrode 25 to protrude toward the TFT array substrate 10 and contacts an upper surface of the TFT. A cell gap between the TFT array substrate 10 and the color filter array substrate 20 is formed by the color spacer 26. The liquid crystal layer 30 is disposed between the TFT array substrate 10 and the color filter array substrate 20, and the TFT array substrate 10 is bonded to the color filter array substrate 20.

Instead of using an input device such as a mouse, a keyboard, a keypad, or the like that is conventionally used with an LCD device or a portable electronic device, display devices may include a touch screen that enables a user to directly input information to the screen with a finger, pen, or other utensil.

A touch screen is applied to monitors of devices such as navigation devices, industrial terminals, notebook computers, automated teller machines (ATMs), game machines, portable devices (e.g., portable phones, MP3 players, personal digital assistants (PDAs), portable media players (PMPs), programmable signal processors (PSPs), portable game machines, digital media broadcasting (DMB) receivers, and tablet personal computers (PCs)), and home appliances (e.g., refrigerators, microwave ovens, and washing machines). Since all users can easily manipulate the touch screen, touch screens are increasing in popularity.

A touch screen may be classified based on the structure where the touch screen is coupled to a liquid crystal panel. The touch screen may an in-cell touch type in which the touch screen is built in a cell of a liquid crystal panel, an on-cell touch type in which the touch screen is disposed on a cell of a liquid crystal panel, an add-on type in which the touch screen is coupled to an outer portion of a display panel, or a one glass solution type in which a touch sensor is disposed on a window glass (or a cover glass) of a display device. Recently, because of its superior aesthetic appearance and reduced thickness, the in-cell touch type touch screen is increasing in popularity.

The in-cell touch type touch screen is used in LCD devices in an in-plane switching (IPS) mode or a fringe field switching (FFS) mode. However, there are many limitations in applying the in-cell touch type to LCD devices based on the TN mode.

Since the related art LCD device based on the TN mode has a structure where a common electrode is spread all over a color filter array substrate, it is difficult to apply the in-cell touch type to the LCD device based on the TN mode. LCD devices using TN mode are typically notebook PCs and PC monitors, but an in-cell touch LCD device based on the TN mode has not been developed.

SUMMARY

Accordingly, the disclosed embodiments describe an in-cell touch liquid crystal display (LCD) device based on a twisted nematic (TN) mode, a method of manufacturing the same, a method of manufacturing a thin film transistor (TFT) array substrate, and a method of manufacturing a color filter array substrate that substantially obviate one or more problems due to limitations and disadvantages of the related art.

The disclosed embodiments include an in-cell touch LCD device based on a TN mode.

The disclosed embodiments include a TFT array substrate configuring an in-cell touch LCD device based on a TN mode and a method of manufacturing the same.

The disclosed embodiments include a color filter array substrate configuring an in-cell touch LCD device based on a TN mode and a method of manufacturing the same.

Additional advantages and features of the invention will be set forth in part in the description which follows, in part will become apparent to those having ordinary skill in the art upon examination of the following, and may be learned in part from practice of the invention. The objectives and other advantages of the invention may be realized and attained by the structure particularly pointed out in the written description and claims hereof as well as the appended drawings.

To achieve these and other advantages, as embodied and broadly described herein, an in-cell touch liquid crystal display (LCD) device includes: a thin film transistor (TFT) array substrate including a gate line and a data line that intersect each other to define a pixel area on a first glass substrate, a TFT disposed in the pixel area, a conductive line disposed on the TFT, and a transparent conductive layer disposed above the conductive line and in electrical contact with the conductive line; a color filter array substrate including: a light shield layer and a color filter disposed on a second glass substrate, an overcoat layer covering the light shield layer and the color filter, a column spacer disposed on the overcoat layer to horizontally overlap with the light shield layer, and a common electrode disposed on the overcoat layer and the column spacer, the conductive line configured to supply the common electrode with a common voltage or a touch driving signal through the transparent conductive layer in electrical contact with the common electrode; and a liquid crystal layer disposed between the TFT array substrate and the color filter array substrate.

In another aspect, a method of manufacturing a thin film transistor (TFT) array substrate includes: forming a data line and a TFT on a first glass substrate; forming a first passivation layer to cover the TFT; forming a conductive line above the first passivation layer in a region horizontally overlapping with the data line; forming a second passivation layer on the conductive line; forming a pixel electrode above the first passivation layer and in electrical contact with the TFT; and forming a transparent conductive layer on the conductive line and in electrical contact with the conductive line.

In another aspect, a method of manufacturing a color filter array substrate includes: forming a light shield layer and a color filter on a second glass substrate; forming an overcoat layer to cover the light shield layer and the color filter; forming a column spacer on the overcoat layer to horizontally overlap with the light shield layer; forming a common electrode on the overcoat layer and the column spacer; and patterning the common electrode as a plurality of blocks to form a plurality of touch electrodes.

In another aspect, a method of manufacturing an in-cell touch liquid crystal display device includes: providing a liquid crystal layer between the TFT array substrate and the color filter array substrate; and bonding the thin film transistor array substrate to the color filter array substrate to bring the conductive line formed on the TFT array substrate into electrical contact with the touch electrode formed on the color filter array substrate.

It is to be understood that both the foregoing general description and the following detailed description provide examples embodiments that are intended to provide further explanation of the invention as claimed.

BRIEF DESCRIPTION OF THE DRAWINGS

The accompanying drawings, which are included to provide a further understanding of the disclosed embodiments and are incorporated in and constitute a part of this application, illustrate the disclosed embodiments and together with the description serve to explain the principles of the disclosed embodiments. In the drawings:

FIG. 13 is a table describing six masks used to manufacture a color filter array substrate according to an embodiment and a layer formed by a mask process corresponding to each mask;

FIGS. 14 to 19 are diagrams illustrating a method of manufacturing a color filter array substrate according to an embodiment.

DETAILED DESCRIPTION

Figure 1:
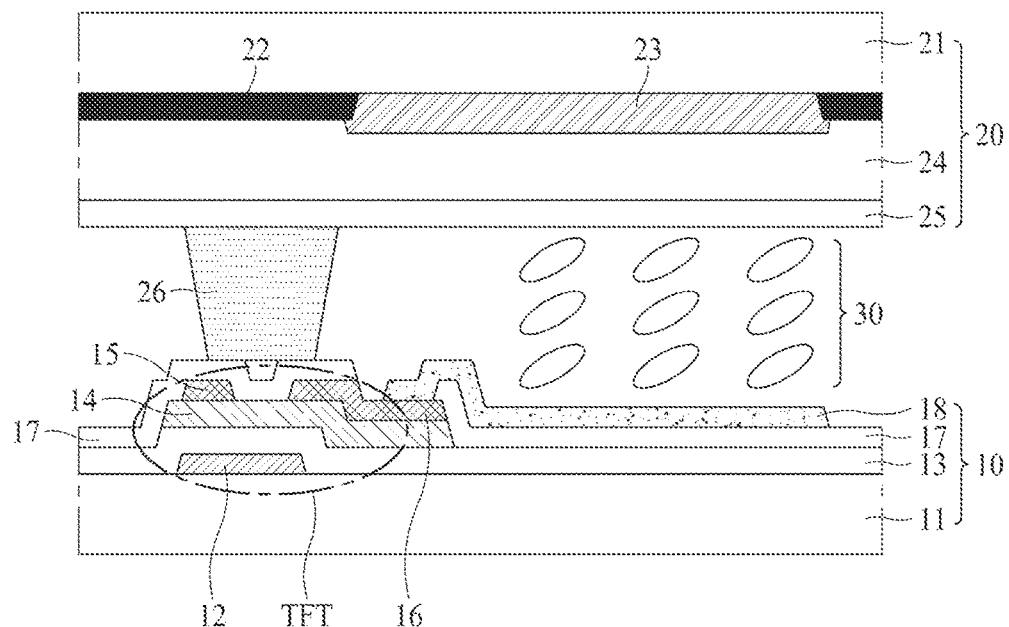
FIG. 1 is a diagram schematically illustrating a related art LCD device based on a TN mode.

Reference will now be made in detail to the example embodiments that are illustrated in the accompanying drawings. Wherever possible, the same reference numbers will be used throughout the drawings to refer to the same or like parts.

Advantages and features of the present invention, and implementation methods thereof will be clarified through the following embodiments described with reference to the accompanying drawings. The present invention may, however, be embodied in different forms and should not be construed as being limited to the embodiments set forth herein. Rather, these embodiments are provided so that this disclosure will be thorough, and will fully convey the scope of the present invention to those skilled in the art. Furthermore, the present invention is defined by the scope of the claims.

Any shape, size, ratio, angle, or number disclosed in the drawings for describing an embodiment is merely an example, and thus, the present invention is not limited to the illustrated details. Like reference numerals refer to like elements throughout. In the following description, when the detailed description of the relevant known function or configuration unnecessarily obscures the features of the disclosed embodiment, such detailed description is omitted. Where the present specification uses "comprise," "have," or "include," another part may be added unless "only" is used. A reference to an element in singular form includes a plurality of that element unless otherwise stated.

In construing an element, the element should be construed as including an error range even when there is no explicit description of an error range.

In describing a positional relationship, for example, when a positional relation between two parts is described as "on," "over," "under," or "next to," one or more other parts may be disposed between the two parts unless "just" or "directly" is used.

In describing a time relationship, for example, when the temporal order of a step is described as "after," "subsequent," "next," or "before," another step, one or more further steps may be included between the step and the other step unless "just" or "direct" is used.

The term "at least one" should be understood as including any and all combinations of one or more of the associated listed items. For example, the meaning of "at least one of a first item, a second item, and a third item" denotes any combination or subset of the items, such as two or more of the first item, the second item, and the third item as well as the first item, the second item, or the third item.

It will be understood that, although the terms "first," "second," and other ordinal terms may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments may be partially or completely coupled to or combined with each other, and may be variously inter-operated with each other and driven technically as those skilled in the art may understand. The embodiments of the present invention may be carried out independently from each other, or may be carried out together in co-dependent relationship.

Before providing a detailed description with reference to the drawings, LCD devices have been variously developed in a twisted nematic (TN) mode, a vertical alignment (VA) mode, an in-plane switching (IPS) mode, and a fringe field switching (FFS) mode according to a scheme of adjusting the alignment of liquid crystals. An LCD device including a TFT array substrate and a color filter array substrate according to an embodiment may be applied to the VA mode as well as the TN mode.

Hereinafter, an in-cell touch LCD device based on a TN mode, a method of manufacturing the same, a method of manufacturing a thin film transistor (TFT) array substrate, and a method of manufacturing a color filter array substrate, according to various embodiments will be described in detail with reference to the accompanying drawings.

Figure 2:
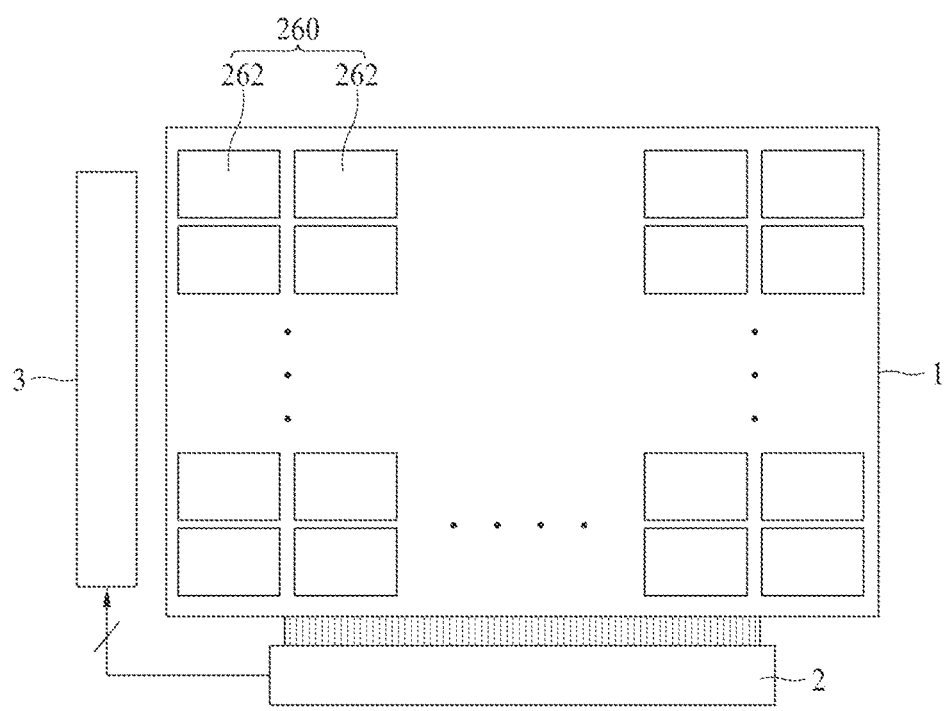
FIG. 2 is a diagram illustrating an in-cell touch LCD device according to an embodiment.

FIG. 2 is a diagram illustrating an in-cell touch LCD device according to an embodiment.

Referring to FIG. 2, the in-cell touch LCD device according to an embodiment may include a liquid crystal panel 1, a driving circuit unit 2, a backlight unit 3, and a power supply (not shown). The driving circuit unit 2 may include a timing controller, a data driver, a gate driver, a touch driver, and a backlight driver.

The gate driver may be integrated on a TFT array substrate of the liquid crystal panel 1 in an amorphous silicon gate (ASG) type or a gate-in panel (GIP) type. Also, the gate driver, the timing controller, the data driver, and the touch driver may each be manufactured as a separate integrated circuit (IC) chip or may all be implemented as one IC chip. A method of driving each of the timing controller, the data driver, the gate driver, the touch driver, and the backlight driver is irrelevant to the disclosed embodiments, and thus, the elements of the driving circuit unit 2 and a method of driving the driving circuit unit 2 are not described.

The liquid crystal panel 1 may include a color filter array substrate (an upper substrate), a TFT array substrate (a lower substrate), and a liquid crystal layer disposed between two the substrates. The liquid crystal panel 1 may be configured to operate in the TN mode, a pixel electrode may be formed in each of a plurality of pixel areas in the TFT array substrate of the liquid crystal panel 1, and a common electrode 260 may be formed on the color filter array substrate. Hereinabove, it has been described above that the liquid crystal panel 1 is configured to operate in the TN mode, but the liquid crystal panel 1 is not limited thereto. In other embodiments, the liquid crystal panel 1 may be configured to operate in the VA mode.

An alignment of the liquid crystal layer may be adjusted according to a vertical electric field generated between the pixel electrode formed on the TFT array substrate and the common electrode 260 formed on the color filter array substrate, and a transmittance of light emitted from the backlight unit 3 may be adjusted according to an alignment of liquid crystal, thereby displaying an image.

In the liquid crystal panel 1, a plurality of pixels for displaying an image and a plurality of touch sensors for detecting a touch may be implemented in one body. By temporally dividing display driving and touch sensing driving, an image may be displayed, and touch may be sensed. In a display period, a data voltage based on image data may be supplied to the pixel electrode of each of the plurality of pixels, and a common voltage (Vcom) may be supplied to the common electrode, thereby displaying an image. In a non-display period (a touch period), a touch driving signal may be supplied to the common electrode (i.e., a plurality of touch electrodes), and then, capacitances of the touch electrodes may be sensed, thereby determining whether there is a touch and detecting a touched position.

Figure 3:
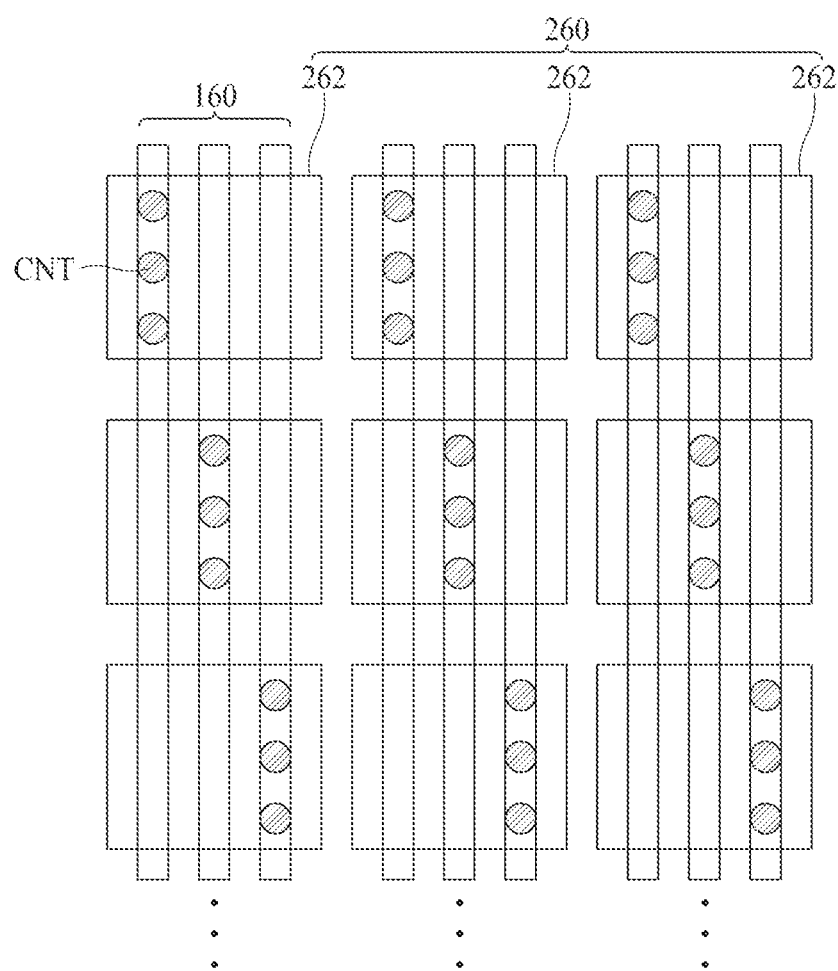
FIG. 3 is a diagram illustrating a touch electrode provided by patterning a common electrode of a color filter array substrate according to an embodiment.

FIG. 3 is a diagram illustrating a touch electrode provided by patterning a common electrode of a color filter array substrate according to an embodiment.

Referring to FIG. 3, the common electrode 260 formed on the color filter array substrate may be patterned as a plurality of touch blocks, and each of the plurality of touch blocks may become a touch electrode 262. One touch block 262 may be formed to correspond to a plurality of pixels. The number of pixels corresponding to each touch block 262 may be changed depending on a size of the liquid crystal panel 1 and a size of each pixel, but for example, each of the plurality of touch blocks 262 may be configured to correspond to twenty horizontal pixels and twelve vertical pixels (20×12).

Here, a plurality of conductive lines 160 and each of the touch electrodes 262 formed on the TFT array substrate may be selectively connected to each other, and thus, the common voltage and the touch driving signal may be applied to the connected touch electrode 262. Each of the touch blocks 262 may operate separately, and thus is not short-circuited when a touch driving signal is applied to another touch block 262. To this end, one conductive line 160 may be connected to one touch block 262. A minimum of one contact part CNT connects a touch block 262 to a corresponding conductive line 160. A contact part CNT may connect a conductive line 160 to the corresponding touch block 262 at every pixel corresponding to the touch block 262 or to only a subset of the pixels corresponding to the touch block 262. FIG. 3 illustrates an example where one touch block 262 is connected to one conductive line 160 by three contact parts CNT. A structure where the touch blocks 262 are connected to the conductive lines 160 will be described in detail with reference to FIGS. 4 and 5.

Figure 4:
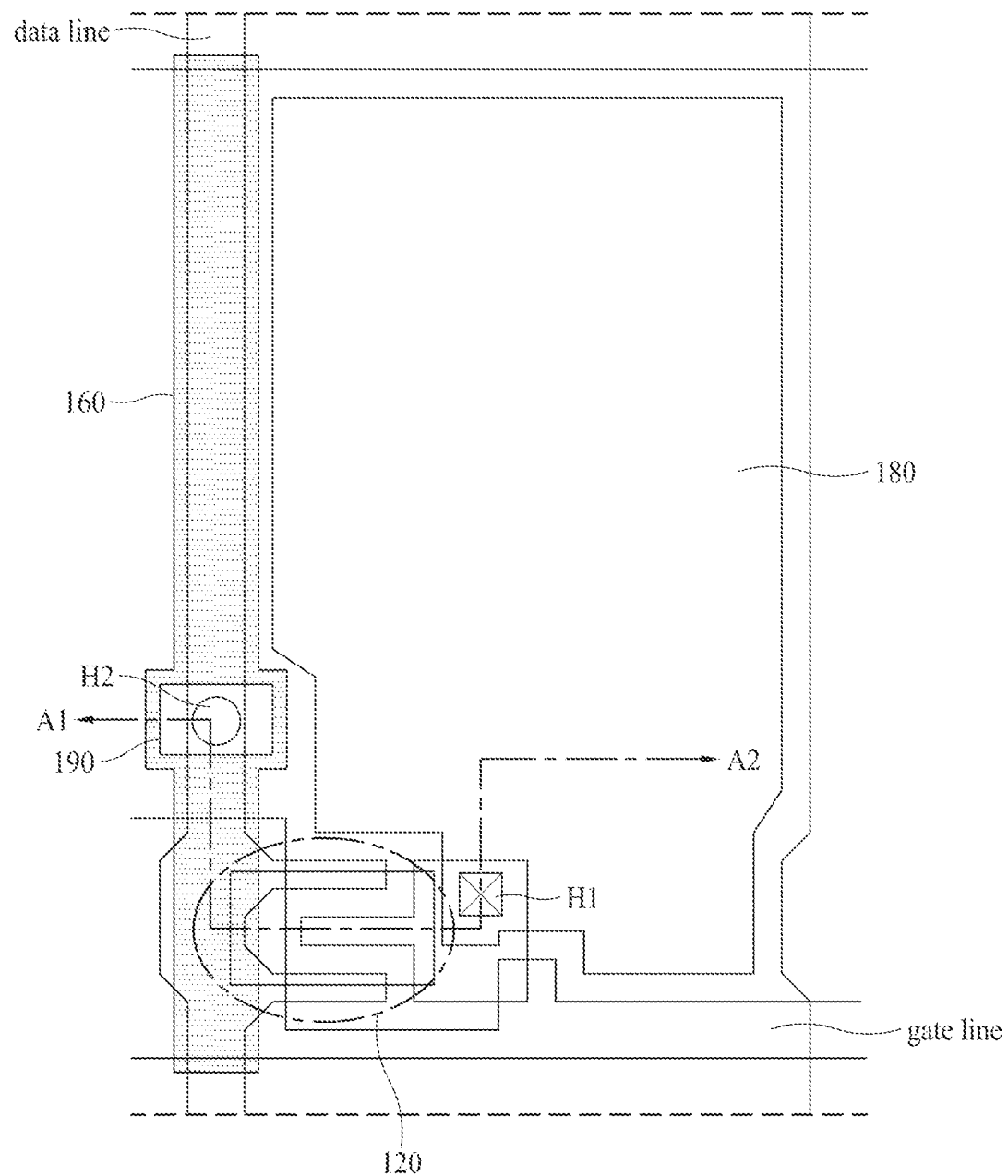
FIG. 4 is a diagram illustrating a plan layout of a TFT array substrate according to an embodiment.

FIG. 4 is a diagram illustrating a plan layout of a TFT array substrate according to an embodiment. In FIG. 4, a plan layout and a cross-sectional structure of one of a plurality of pixels are illustrated.

Referring to FIG. 4, a gate line may be disposed in a first direction (for example, a horizontal direction) on a substrate, and a data line may be disposed in a second direction (for example, a vertical direction) to intersect the gate line. A pixel area may be defined around an intersection of the gate line and the data line. A TFT 120, a pixel electrode 180, and a storage capacitor which are switching elements may be included in the pixel area. The pixel electrode 180 is formed in a display area of the pixel area.

A conductive line 160 may be disposed on the data line, and a transparent conductive layer 190 may be disposed on the conductive line 160 to horizontally overlap with the conductive line 160 with a passivation layer of an insulating material therebetween. A contact hole H2 may be formed by removing the passivation layer in order for the conductive line 160 to be exposed, and the conductive line 160 may be electrically connected to the transparent conductive layer 190 through the contact hole H2. A column spacer may be disposed on a color filter array substrate to horizontally overlap with the transparent conductive layer 190, and a common electrode (a touch electrode) disposed on the color filter array substrate may be electrically connected to the transparent conductive layer 190.

Although not shown, a black light shield pattern (BLSP) for blocking light emitted from a backlight unit may be included in each of a plurality of pixel areas. The black light shield pattern may surround an opening of each of the pixel areas and may be disposed on the same layer as the gate line.

Figures 5, 6:
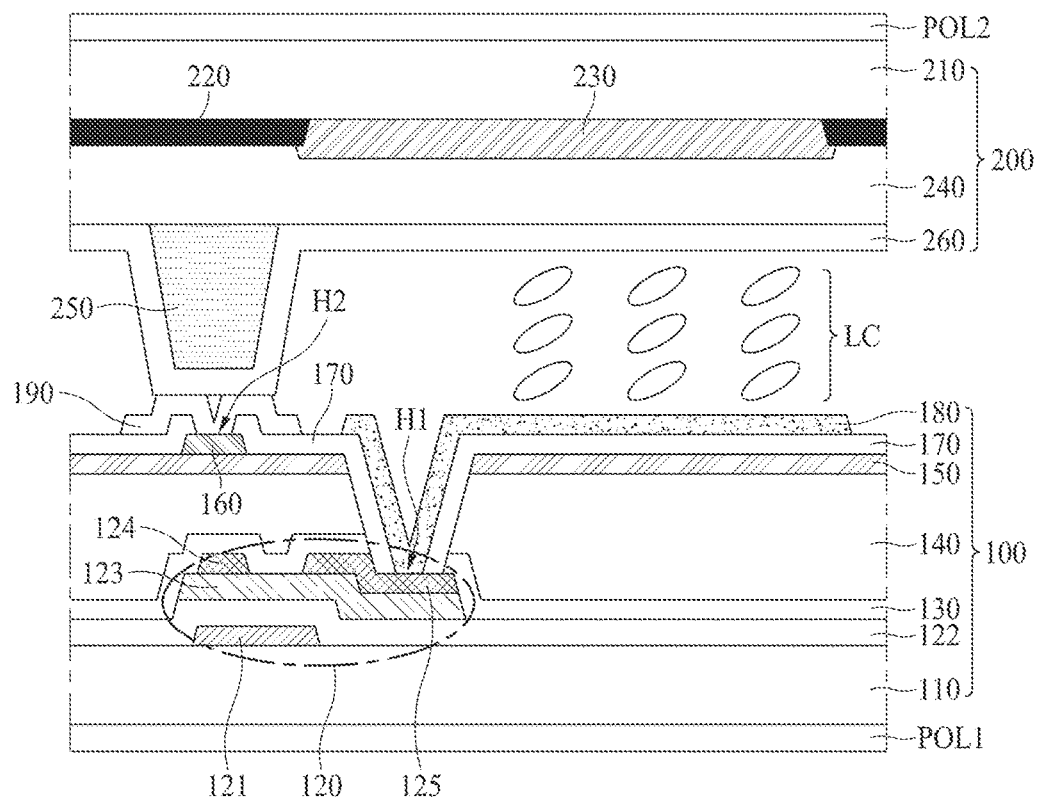
FIG. 5 is a cross-sectional view illustrating a cross-sectional structure of a liquid crystal panel configured as an in-cell touch LCD device according to an embodiment and illustrates a view of a TFT array substrate and a color filter array substrate along path A1-A2 of FIG. 4.
FIG. 6 is a table describing six masks used to manufacture a TFT array substrate and a layer formed by a mask process corresponding to each mask according to an embodiment.

FIG. 5 is a cross-sectional view illustrating a cross-sectional structure of a liquid crystal panel configured as an in-cell touch LCD device according to an embodiment and illustrates a view of a TFT array substrate and a color filter array substrate along path A1-A2 of FIG. 4. In FIG. 5, a plan layout and a cross-sectional structure of one of a plurality of pixels are illustrated.

Referring to FIG. 5, the in-cell touch LCD device according to an embodiment may include a TFT array substrate 100, a color filter array substrate 200, and a liquid crystal layer LC disposed between the TFT array substrate 100 and the color filter array substrate 200. The TFT array substrate 100 and the color filter array substrate 200 may be bonded to each other and may be sealed by a sealant. A lower polarizing film POL1 may be disposed under the TFT array substrate 100, and an upper polarizing film POL2 may be disposed on the color filter array substrate 200.

First, elements and a structure of the TFT array substrate 100 will now be described.

The TFT array substrate 100 may include a first glass substrate 110, a TFT 120, a first buffer layer 130, a first passivation layer (PAS1) 140, a second buffer layer 150, a conductive line 160, a second passivation layer (PAS2) 170, a pixel electrode 180, and a transparent conductive layer 190.

The TFT 120 may be disposed in each of a plurality of pixel areas included on the TFT array substrate 100, and may have a bottom gate structure. The TFT 120 may include a gate electrode 121 disposed under a gate insulation layer 122, an active layer 123, a source electrode 124, and a drain electrode 125. The active layer 123, the source electrode 124, and the drain electrode 125 may be disposed on the gate insulation layer 122. Although not shown, a storage capacitor may be formed in each of the pixel areas. In FIG. 5, the TFT 120 is illustrated as having a bottom gate structure, but it is not limited thereto. In other embodiments, the TFT 120 may have a top gate structure.

The gate electrode 121 may be formed on the first glass substrate 110. The gate electrode 121 may branch from the gate line illustrated in FIG. 4, and metal of a gate electrode in a TFT area may be the gate electrode 121. In this case, the gate electrode 121 may be formed of copper (Cu), aluminum (Al), molybdenum (Mo), titanium (Ti), Mo—Ti, other metals, other alloys, or other conductors and may have a thickness of 2,000 Å to 3,000 Å.

The gate insulation layer 122 may be formed to cover the gate line and the gate electrode 121. The gate insulation layer 122 may be formed of silicon oxide ($SiO_2$) or nitride silicon (SiNx) and may have a thickness of 1,000 Å to 3,000 Å. As another example, the gate insulation layer 122 may be formed in a multi-layer structure where a $SiO_2$ layer and a SiNx layer are stacked. The gate insulation layer 122 may be formed by depositing tetra ethyl ortho silicate (TEOS) or middle temperature oxide (MTO) in a chemical vapor deposition (CVD) process.

The active layer 123 may be formed on the gate insulation layer 122 to horizontally overlap with the gate electrode 121. The active layer 123 may have a thickness of 500 Å to 1,500 Å. The active layer 123 may be formed of amorphous silicon, poly silicon, low temperature poly silicon (LTPS), oxide, and/or the like.

The source electrode 124 may be formed on one side of an upper surface of the active layer 123, and the drain electrode 125 may be formed on the other side. Each of the source electrode 124 and the drain electrode 125 may be formed of copper (Cu), aluminum (Al), molybdenum (Mo), titanium (Ti), Mo—Ti, other metals, other alloys, or other conductors and may have a thickness of 2,000 Å to 3,000 Å. The TFT 120 may be configured with the gate electrode 121, the gate insulation layer 122, the active layer 123, the source electrode 124, and the drain electrode 125.

The first buffer layer 130 may be formed over the first glass substrate 110 to cover the TFT 120. The first buffer layer 130 may be formed of $SiO_2$, SiNx, and/or the like and may have a thickness of 1,000 Å to 2,000 Å.

The first passivation layer 140 may be formed to cover the first buffer layer 130. The first passivation layer 140 may be formed of photo acryl and may have a thickness of 2.0 μm to 3.0 μm. Accordingly, the first passivation layer 140 is thicker than the TFT 120 (between about 1.9 and 5.5 times thicker). The first passivation layer 140 may be thickly formed for reducing a parasitic capacitance between the conductive line 160 and the TFT 120 and a parasitic capacitance between lower metal layers.

The second buffer layer 150 may be formed to cover the first passivation layer 140. The second buffer layer 150 may be formed of $SiO_2$, SiNx, and/or the like and may have a thickness of 1,000 Å to 2,000 Å.

The conductive line 160 may be formed on a portion of an upper surface of the second buffer layer 150 horizontally overlapping the data line. In FIG. 4, a position at which the conductive line 160 is formed is illustrated. The conductive line 160 may transfer a common voltage (Vcom) and a touch driving signal to a common electrode (a touch electrode) and may be connected to an output channel of a driving circuit unit. In a display period, the common voltage (Vcom) may be supplied to the common electrode through the conductive line 160, thereby displaying an image. In a non-display period, the touch driving signal may be supplied to the conductive line 160, and thus, a touch may be sensed.

The conductive line 160 may have a line width which is the same as or broader than that of the data line. The conductive line 160 may be formed of copper (Cu), aluminum (Al), molybdenum (Mo), titanium (Ti), Mo—Ti, other metals, other alloys, or other conductors and may have a thickness of 1,000 Å to 2,000 Å. The conductive line 160 may be formed in a multi-layer structure where a Cu layer, a Mo layer, an Al layer, and a Mo layer are stacked.

The second passivation layer 170 may be formed to cover a portion of the conductive line 160 and the second buffer layer 150. The second passivation layer 170 may be formed of $SiO_2$, SiNx, and/or the like and may have a thickness of 1,000 Å to 2,000 Å.

A first contact hole H1 exposing a top of the drain electrode 125 of the TFT 120 may be formed by removing a portion of each of the first buffer layer 130, the first passivation layer 140, the second buffer layer 150, and the second passivation layer 170 corresponding to a portion which horizontally overlaps with the drain electrode 125 of the TFT 120. Also, a second contact hole H2 exposing a top of the conductive line 160 may be formed by removing a portion of the second passivation layer 170 corresponding to a portion which horizontally overlaps with the conductive line 160.

The pixel electrode 180 may be formed on a portion of an upper surface of the second passivation layer 170 around the opening of the first contact hole 180. The pixel electrode 180 may be formed in the first contact hole H1 and may be electrically connected to the drain electrode 125 of the TFT 120. The pixel electrode 180 may be formed of a transparent conductive material such as indium-tin-oxide (ITO), indium-zinc-oxide (IZO), indium tin zinc oxide (ITZO), and/or the like and may have a thickness of 700 Å to 1,500 Å.

The transparent conductive layer 190 may be formed on a portion of an upper surface of the second passivation layer 170 horizontally overlapping with the conductive line 160. An upper surface of the conductive line 160 may be exposed by the second contact hole H2, and thus, the conductive line 160 may be electrically connected to the transparent conductive layer 190. The transparent conductive layer 190 may be formed of a transparent conductive material such as indium-tin-oxide (ITO), indium-zinc-oxide (IZO), indium tin zinc oxide (ITZO), and/or the like and may have a thickness of 700 Å to 1,500 Å.

Here, the pixel electrode 180 and the transparent conductive layer 190 may be formed of the same material through the same manufacturing process. In FIGS. 4 and 5, the pixel electrode 180 is formed in a plate shape in a pixel area, but the present embodiment is not limited thereto. In other embodiments, the pixel electrode 180 may be patterned and formed in a finger shape.

The TFT array substrate 100 according to an embodiment may be configured with the above-described elements.

Hereinafter, elements and a structure of the color filter array substrate 200 will be described.

The color filter array substrate 200 may include a second glass substrate 210, a light shield layer (a black matrix) 220, red (R), green (G), and blue (B) color filters (hereinafter referred to as a color filter) 230, an overcoat layer 240, a column spacer 250, and a common electrode 260.

The light shield layer (the black matrix) 220 may be formed on the second glass substrate 210. The light shield layer (the black matrix) 220 may be included an opaque material to define a plurality of pixel areas. The R, G, and B color filters 230 may be respectively formed in the plurality of pixel areas defined by the light shield layer (the black matrix) 220. The light shield layer (the black matrix) 220 may be disposed to correspond to a light shield area, and the color filter 230 may be disposed to correspond to an opening area.

The overcoat layer 240 may be formed to cover the light shield layer (the black matrix) 220 and the color filter 230. An upper surface of the second glass substrate 210 may be planarized by the overcoat layer 240. In FIG. 5, one of the plurality of pixel areas is illustrated, and the red color filter of the R, G, and B color filters 230 is illustrated as an example.

A plurality of column spacers 250 may be formed in a region of an upper surface of the overcoat layer 240 corresponding to the light shield layer (the black matrix) 220. To describe a position of the column spacer 250 with reference to FIGS. 4 and 5, the column spacers 250 may be formed on the overcoat layer 240 to horizontally overlap with the conductive line 160 and the transparent conductive layer 190 which are formed on the TFT array substrate 100. Since the conductive line 160 and the column spacers 250 are formed to horizontally overlap with the data line, an aperture ratio of each of a plurality of pixels is preserved when an in-cell touch structure is applied to a display device. That is, the conductive line 160 and the column spacers 250 may be aligned in one row on a cross-sectional surface, and thus, a separate structure for electrically connecting the conductive line 160 to the touch electrode 262 is not formed, which would reduce the aperture ratio.

The plurality of column spacers 250 may maintain a cell gap between the TFT array substrate 100 and the color filter array substrate 200. Each of the column spacers 250 may be formed in, for example, a circular shape or a bar shape when seen from above.

In FIG. 5, one of the plurality of pixel areas is illustrated, and one of the plurality of column spacers 250 is illustrated. Although not shown, a plurality of push spacers may be formed in order for a certain portion of the color filter array substrate 200 to be pressed when pressure is applied to the color filter array substrate 200.

The common electrode 260 may be formed to cover the overcoat layer 240 and the column spacers 250. The common electrode 260 may be formed of a transparent conductive material such as indium-tin-oxide (ITO), indium-zinc-oxide (IZO), indium tin zinc oxide (ITZO), and/or the like and may have a thickness of 700 Å to 1,500 Å.

To provide a description with reference to FIGS. 3 and 5, the in-cell touch LCD device according to an embodiment may use the common electrode 260, formed on the color filter array substrate 200, as the touch electrode. To this end, the common electrode 260 may be patterned as a plurality of blocks, and each of the blocks of the patterned common electrode 260 may be a separate touch electrode 262.

The color filter array substrate 200 according to an embodiment may be configured with the above-described elements.

When the TFT array substrate 100 is bonded to the color filter array substrate 200, the common electrode (the touch electrode) 260 formed on the column spacer 250 may electrically contact the transparent conductive layer 190 formed on the TFT array substrate 100.

Here, since the transparent conductive layer 190 electrically contacts the conductive line 160 through the second contact hole H2, the touch electrode 262 formed on the color filter array substrate 200 may electrically contact the conductive line 160 formed on the TFT array substrate 100 by using a protruding form of the column spacer 250. The in-cell touch LCD device including the above-described elements according to an embodiment enables an in-cell touch type to be applied to the TN mode.

In the display period, the data driver may supply the common voltage to the conductive line 160 to allow all touch electrodes 262 to act as the common electrode 260, thereby displaying an image. Also, in the non-display period, the touch driver may supply the touch driving signal to the conductive line 160 in a self-touch sensing type and then may sense a capacitance of each of the touch electrodes 262, thereby allowing a touch to be sensed.

FIG. 6 is a table describing six masks used to manufacture a TFT array substrate according to an embodiment and a layer formed by a mask process corresponding to each mask, and FIGS. 7 to 12 are diagrams illustrating a method of manufacturing a TFT array substrate according to an embodiment.

Hereinafter, a method of manufacturing the TFT array substrate 100 according to an embodiment will be described with reference to FIGS. 6 to 12.

As illustrated in FIG. 6, the TFT array substrate 100 according to an embodiment may be manufactured through a 6-mask manufacturing process.

Figure 7:
FIGS. 7 to 12 are diagrams illustrating a method of manufacturing a TFT array substrate according to an embodiment.

Referring to FIG. 7, a gate metal layer may be formed by coating a conductor such as Cu, Al, Mo, Ti, Mo/Ti, and/or the like on the first glass substrate 110. Subsequently, the gate line (not shown) and the gate electrode 121 may be formed by performing a photolithography process and an etching process using a first mask. In this case, the gate line and the gate electrode 121 may have a thickness of 2,000 Å to 3,000 Å.

Figure 8:
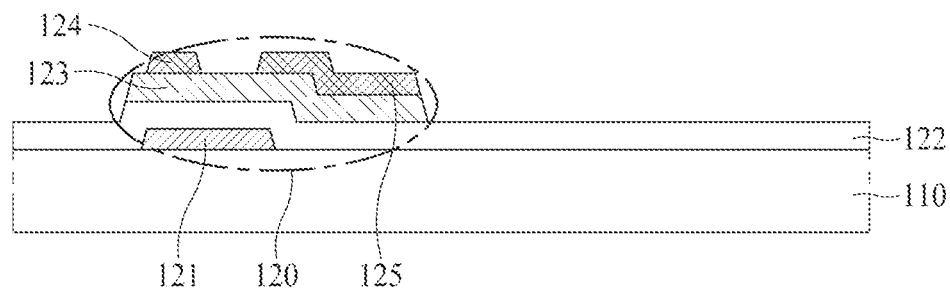

Referring to FIG. 8, the gate insulation layer 122 may be formed by coating SiO$_2$, SiNx, and/or the like on a whole surface of the first glass substrate to cover the gate line and the gate electrode 121. The gate insulation layer 122 may have a thickness of 1,000 Å to 3,000 Å.

As another example, the gate insulation layer 122 may be formed in a multi-layer structure where a SiO$_2$ layer and a SiNx layer are stacked. The gate insulation layer 122 may be formed by depositing tetra ethyl ortho silicate (TEOS) or middle temperature oxide (MTO) in a chemical vapor deposition (CVD) process.

Subsequently, a semiconductor layer may be formed by coating amorphous silicon, poly silicon, low temperature poly silicon (LTPS), oxide, and/or the like to cover the gate electrode 121.

Subsequently, a source/drain metal layer may be formed by coating a conductor such as Cu, Al, Mo, Ti, Mo/Ti, and/or the like on the semiconductor layer.

Subsequently, the semiconductor layer and the source/drain metal layer may be patterned by performing a photolithography process and an etching process using a second mask (a halftone mask).

Therefore, the active layer 123 may be formed to horizontally overlap with the gate electrode 121, and the data line intersecting the gate line may be formed. Also, the source electrode 124 may be formed on one side of an upper surface of the active layer 123, and the drain electrode 125 may be formed on the other side. The active layer 123 may have a thickness of 500 Å to 1,500 Å, and the source electrode 124 and the drain electrode 125 may each have a thickness of 2,000 Å to 3,000 Å.

The TFT 120 having the bottom gate structure may be configured with the gate electrode 121, the gate insulation layer 122, the active layer 123, the source electrode 124, and the drain electrode 125. In FIG. 8, the TFT 120 is illustrated as having the bottom gate structure, but is not limited thereto. In other embodiments, the TFT 120 may be formed in the top gate structure.

Figure 9:
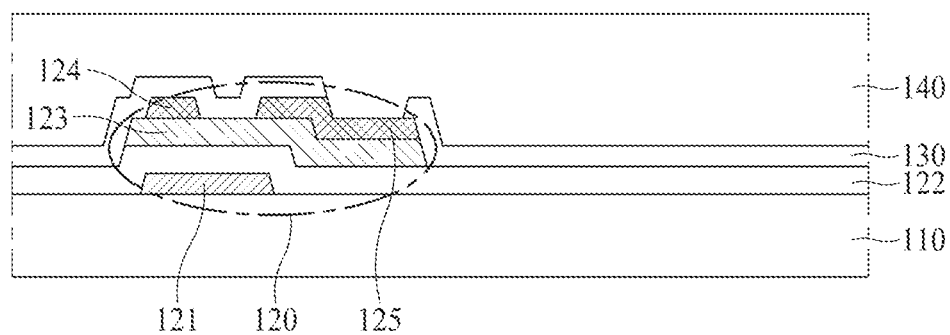

Referring to FIG. 9, by performing a photolithography process and an etching process using a third mask, the first buffer layer 130 may be formed by coating SiO$_2$, SiNx, and/or the like on a whole surface of the first glass substrate 110 to cover the TFT 120. The first buffer layer 130 may have a thickness of 1,000 Å to 2,000 Å.

Subsequently, the first passivation layer 140 may be formed by coating photo acryl to cover the first buffer layer 130. The first passivation layer 140 may have a thickness of 2.0 μm to 3.0 μm.

Figure 10:
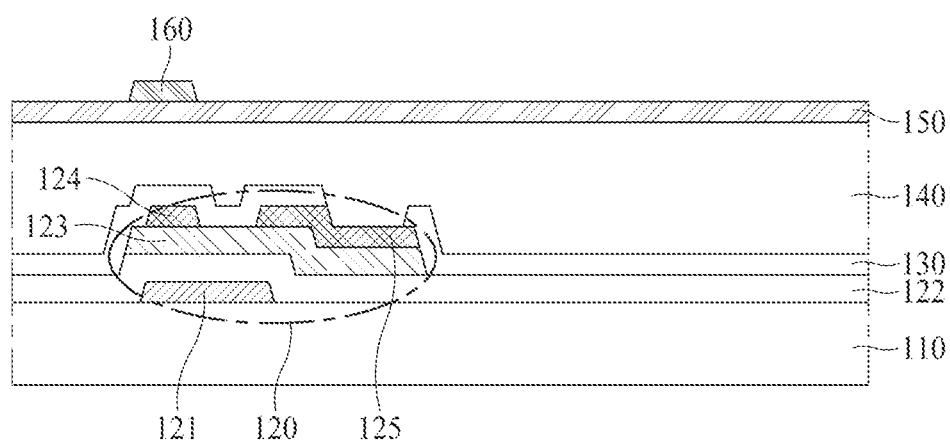

Referring to FIG. 10, the second buffer layer 150 may be formed by coating SiO$_2$, SiNx, and/or the like to cover the first passivation layer 140. The second buffer layer 150 may have a thickness of 1,000 Å to 2,000 Å.

Subsequently, a conductive metal layer may be formed by coating a conductor such as Cu, Al, Mo, Ti, M—Ti, and/or the like on the second glass substrate 110.

Subsequently, by performing a photolithography process and an etching process using a fourth mask, the conductive line 160 may be formed on a portion of an upper surface of the second buffer layer 150 which horizontally overlaps with the data line and the source electrode 124. The conductive line 160 may have a line width which is the same as or broader than that of the data line, and may have a thickness of 1,000 Å to 2,000 Å. The conductive line 160 may be formed in a multi-layer structure where a Cu layer, a Mo layer, an Al layer, and a Mo layer are stacked.

The conductive line 160 may transfer the common voltage (Vcom) and the touch driving signal to the common electrode (the touch electrode) and may be connected to an output channel of a driving circuit unit. In the display period, the common voltage (Vcom) may be supplied to the common electrode through the conductive line 160, thereby displaying an image. In the non-display period, the touch driving signal may be supplied to the conductive line 160, and thus, a touch may be sensed.

Figure 11:
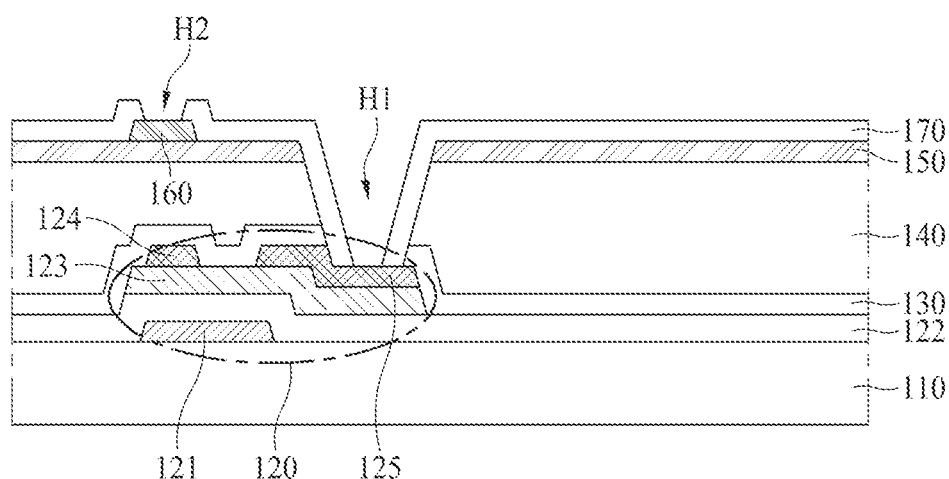

Referring to FIG. 11, the second passivation layer 170 may be formed by coating SiO$_2$, SiNx, and/or the like to cover the second buffer layer 150 and the conductive line 160. The second passivation layer 170 may have a thickness of 1,000 Å to 2,000 Å.

Subsequently, a portion of each of the first buffer layer 130, the first passivation layer 140, the second buffer layer 150, and the second passivation layer 170 corresponding to the drain electrode 125 may be removed by performing a photolithography process and an etching process using a fifth mask. Since the portion of each of the first buffer layer 130, the first passivation layer 140, the second buffer layer 150, and the second passivation layer 170 is removed, the first contact hole H1 exposing the top of the drain electrode 125 may be formed.

Simultaneously, a portion of the second passivation layer 170 horizontally overlapping with the conductive line 160 may be removed. Since the portion of the second passivation layer 170 is removed, the second contact hole H2 exposing the top of the conductive line 160 may be formed. The first contact hole H1 and the second contact hole H2 may be simultaneously formed through the same mask process, and thus, the number of detailed processes is reduced, and manufacturing efficiency is enhanced.

Figure 12:
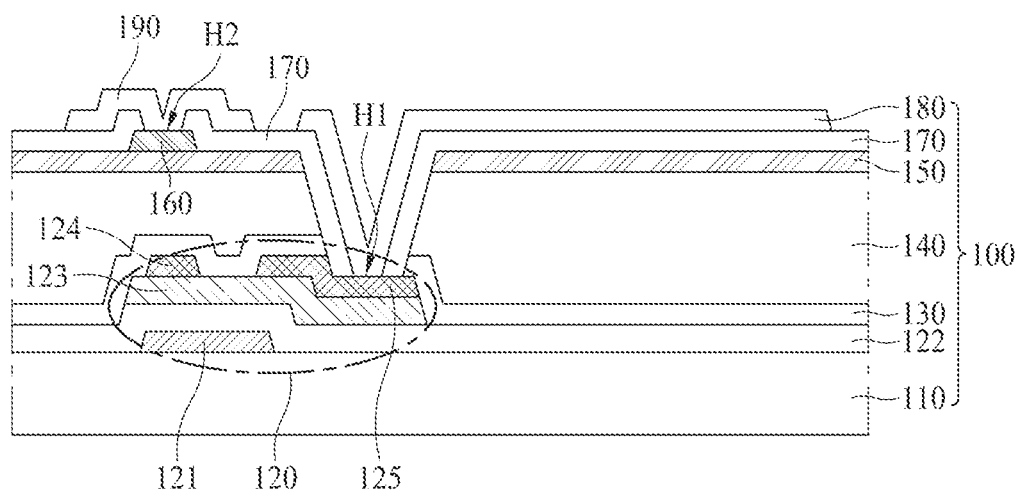

Referring to FIG. 12, a transparent conductive material such as ITO, IZO, ITZO, and/or the like may be coated to cover the second passivation layer 170.

Subsequently, by patterning a transparent conductive material layer through a photolithography process and an etching process using a sixth mask, the pixel electrode 180 may be formed on a portion of an upper surface of the second passivation layer 170 corresponding to an opening area. The pixel electrode 180 may have a thickness of 700 Å to 1,500 Å. In this case, the pixel electrode 180 may be formed in the first contact hole H1, and thus, the drain electrode 125 of the TFT 120 may electrically contact the pixel electrode 180. The pixel electrode 180 is formed in a plate shape in a pixel area, or may be patterned and formed in a finger shape.

Simultaneously, the transparent conductive layer 190 may be formed of a transparent conductive material, such as ITO, IZO, ITZO, and/or the like, in a region of an upper surface of the second passivation layer 170 overlapping with the conductive line 160. The transparent conductive layer 190 may have a thickness of 700 Å to 1,500 Å. The pixel electrode 180 and the transparent conductive layer 190 may be simultaneously formed through the same mask process, and thus, the number of detailed processes is reduced, and manufacturing efficiency is enhanced.

The transparent conductive layer 190 may be formed with an upper surface of the conductive line 160 being exposed by the second contact hole H2, and thus may electrically contact the conductive line 160.

The TFT array substrate 100 according to an embodiment may be manufactured by the above-described manufacturing process.

FIG. 13 is a table describing six masks used to manufacture a color filter array substrate according to an embodiment and a layer formed by a mask process corresponding to each mask, and FIGS. 14 to 19 are diagrams illustrating a method of manufacturing a color filter array substrate according to an embodiment.

Hereinafter, a method of manufacturing the color filter array substrate 200 according to an embodiment will be described with reference to FIGS. 13 to 19.

As illustrated in FIG. 13, the color filter array substrate 200 according to an embodiment may be manufactured through a 6-mask manufacturing process.

Referring to FIG. 14, a resin or a black resin containing a light blocking pigment may be coated on the second glass substrate 210, and then, the light shield layer (the black matrix) 220 may be formed by performing a photolithography process and an etching process using a first mask. An opening of each of the plurality of pixel areas may be defined by the light shield layer (the black matrix) 220. The light shield layer (the black matrix) 220 may be formed of a conductive metal material, such as Cr, Mo, Ti, Cr-Oxide, and/or the like, or a carbon-based organic material.

Although not shown, the light shield layer (the black matrix) 220 may be formed in a bezel area of a liquid crystal panel to cover a non-display area and a plurality of signal lines which are routed at an edge of the TFT array substrate 100.

Referring to FIG. 15, the R, G, and B color filters 230 may be sequentially disposed in a pixel area defined by the light shield layer (the black matrix) 220 by sequentially performing a photolithography process and an etching process using a second mask. In FIG. 15, one of the plurality of pixel areas is illustrated, and the red color filter of the R, G, and B color filters 230 is illustrated as an example.

Figure 16:
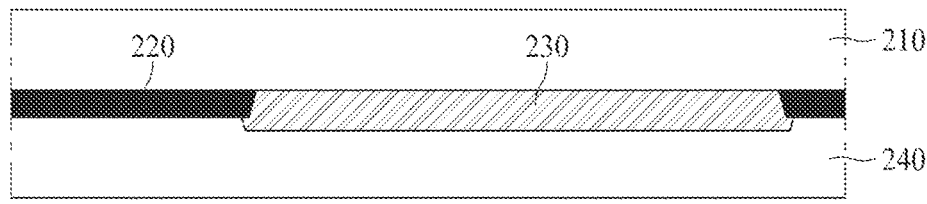

Referring to FIG. 16, an overcoat material may be coated to cover the light shield layer (the black matrix) 220 and the color filter 230. Subsequently, the overcoat layer 240 may be formed by performing a photolithography process and an etching process using a third mask. An upper surface of the second glass substrate 210 may be planarized by the overcoat layer 240.

Figure 17:
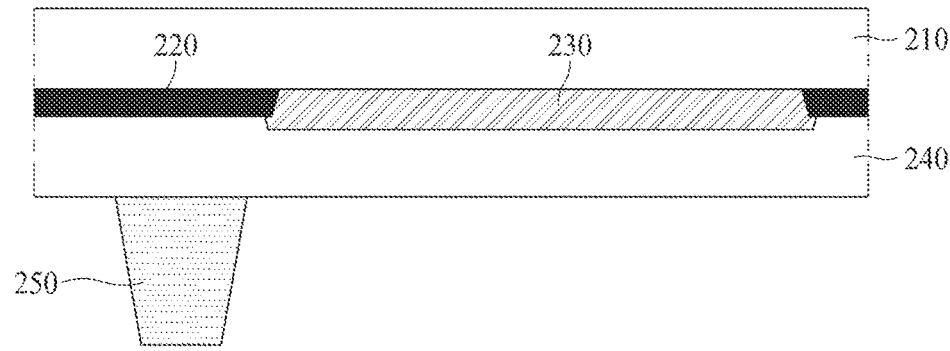

Referring to FIG. 17, an organic layer or an inorganic layer may be formed by coating an organic material or an inorganic material on a region of an upper surface of the overcoat layer 240 corresponding to the light shield layer (the black matrix) 220. Subsequently, the column spacer 250 may be formed by patterning the organic layer or the inorganic layer through a photolithography process and an etching process using a fourth mask.

To describe a position of the column spacer 250 with further reference to FIG. 4, the column spacer 250 may be formed on the overcoat layer 240 to horizontally overlap with the conductive line 160 and the transparent conductive line 190 which are formed on the TFT array substrate 100. The plurality of column spacers 250 may maintain a cell gap between the TFT array substrate 100 and the color filter array substrate 200. Each of the column spacers 250 may be formed in a circular shape or a bar shape when seen from above.

Figure 18:
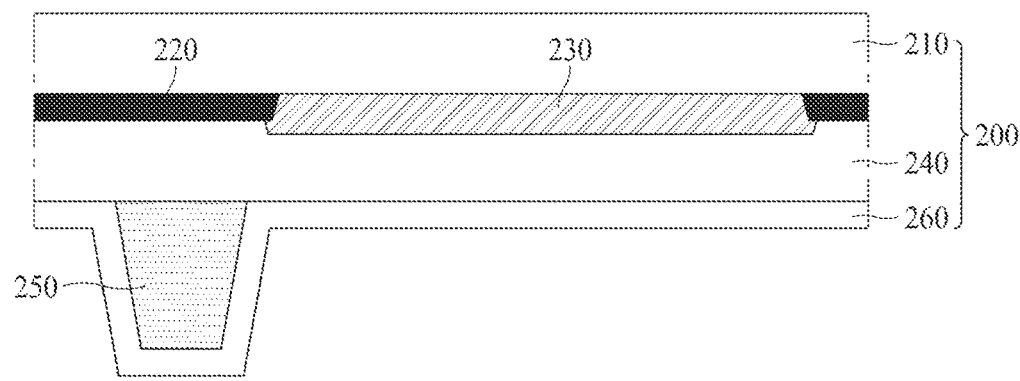

Referring to FIG. 18, a transparent conductive material such as ITO, IZO, ITZO, and/or the like may be coated to cover the overcoat layer 240 and the column spacer 250.

Subsequently, the common electrode 260 may be formed on the overcoat layer 240 and the column spacer 250 by patterning a transparent conductive material layer through a photolithography process and an etching process using a fifth mask. The common electrode 260 may have a thickness of 700 Å to 1,500 Å.

Figure 19:
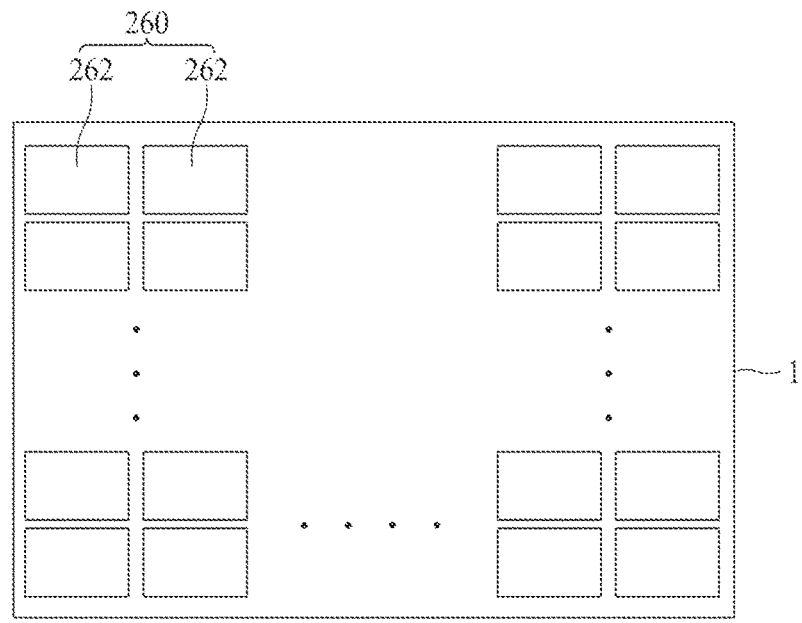

Referring to FIG. 19, the in-cell touch LCD device according to an embodiment may use the common electrode 260, formed on the color filter array substrate 200, as the touch electrode. To this end, the common electrode 260 may be patterned as a plurality of blocks by performing the photolithography process and the etching process using the sixth mask, and each of the blocks of the patterned common electrode 260 may be a separate touch electrode 262.

The color filter array substrate 200 according to an embodiment may be manufactured by the above-described manufacturing process.

Figure 20:
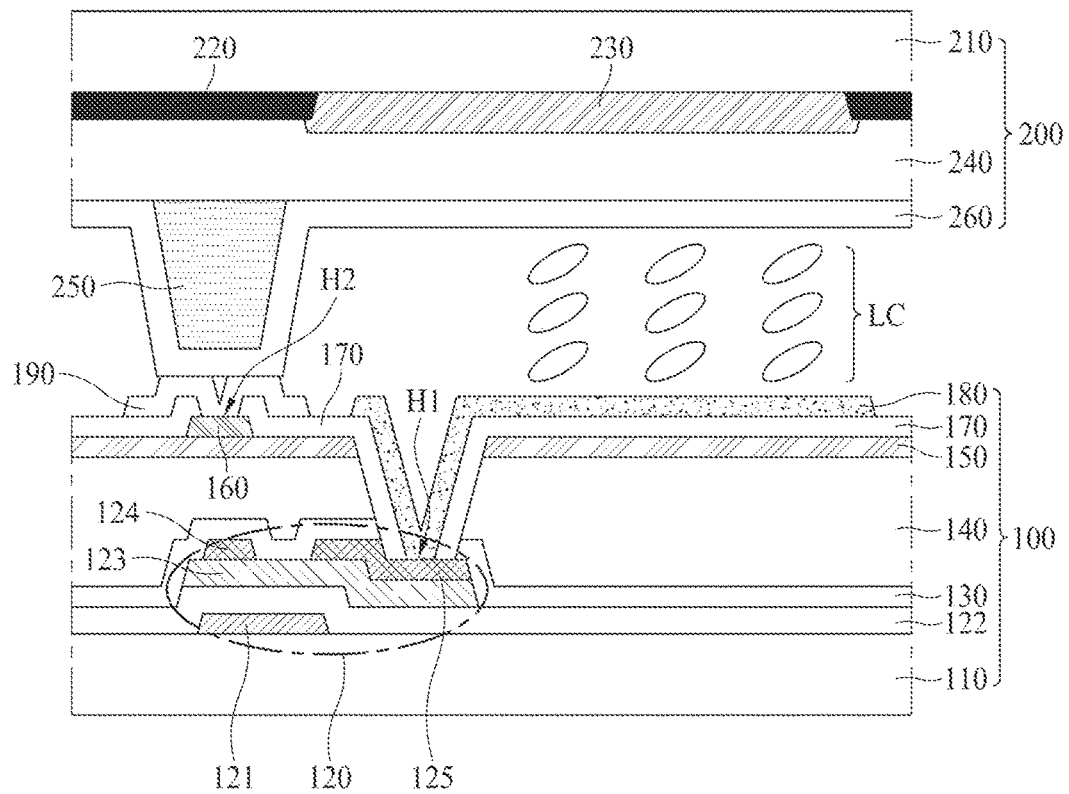
FIG. 20 is a diagram illustrating that a conductive line is electrically connected to a touch electrode by bonding a TFT array substrate to a color filter array substrate according to an embodiment.

FIG. 20 is a diagram illustrating that a conductive line is electrically connected to a touch electrode by bonding a TFT array substrate to a color filter array substrate.

Referring to FIG. 20, the liquid crystal layer LC may be disposed in the cell gap between the TFT array substrate 100 and the color filter array substrate 200, and the TFT array substrate 100 may be bonded to the color filter array substrate 200 by the sealant.

When the TFT array substrate 100 is bonded to the color filter array substrate 200, the common electrode (the touch electrode) 260 formed on the column spacer 250 may electrically contact the transparent conductive layer 190 formed on the TFT array substrate 100. Here, since the transparent conductive layer 190 electrically contacts the conductive line 160 through the second contact hole H2, the touch electrode 262 formed on the color filter array substrate 200 may electrically contact the conductive line 160 formed on the TFT array substrate 100 by using a protruding form of the column spacer 250.

The in-cell touch LCD device according to an embodiment may be manufactured by the above-described manufacturing process.

The above embodiments describe an in-cell touch LCD device based on the TN mode; a TFT array substrate configuring the in-cell touch LCD device based on the TN mode and the method of manufacturing the same; and a color filter array substrate configuring the in-cell touch LCD device based on the TN mode and the method of manufacturing the same.

It will be apparent to those skilled in the art that various modifications and variations can be made in the present invention without departing from its spirit or scope. Thus, it is intended that the present invention covers modifications and variations of this invention that come within the scope of the appended claims and their equivalents.

What is claimed is:

1. An in-cell touch liquid crystal display (LCD) device comprising:
a thin film transistor (TFT) array substrate including:
a gate line and a data line that intersect each other to define a pixel area on a first glass substrate,
a TFT disposed in the pixel area,
a first passivation layer disposed above the TFT,
a conductive line disposed on the first passivation layer to horizontally overlap with the data line, and
a transparent conductive layer disposed above the conductive line and in electrical contact with the conductive line;
a pixel electrode disposed above the first passivation layer, the pixel electrode electrically connected to the TFT through a first contact hole in the first passivation layer, the pixel electrode being on a same layer as at least a part of the transparent conductive layer,
a color filter array substrate including:
a light shield layer and a color filter disposed on a second glass substrate,
an overcoat layer covering the light shield layer and the color filter,
a column spacer disposed on the overcoat layer to horizontally overlap with the light shield layer, and
a common electrode disposed on the overcoat layer and the column spacer, the conductive line configured to supply the common electrode with a common voltage or a touch driving signal through the transparent conductive layer in electrical contact with the common electrode; and
a liquid crystal layer disposed between the TFT array substrate and the color filter array substrate.

2. The in-cell touch LCD device of claim 1, further comprising:
a first buffer layer disposed between the first passivation layer and the TFT; and
a second buffer layer disposed between the conductive line and the first passivation layer.

3. The in-cell touch LCD device of claim 1, further comprising a second passivation layer disposed on an upper surface of the conductive line, the transparent conductive layer electrically connected to the conductive line through a second contact hole in the second passivation layer.

4. The in-cell touch LCD device of claim 3, wherein the second passivation layer contacts the TFT through the first contact hole in the first passivation layer.

5. The in-cell touch LCD device of claim 3, wherein the transparent conductive layer and the pixel electrode are each on the second passivation layer.

6. The in-cell touch LCD device of claim 1, wherein the transparent conductive layer is composed of a same material as the pixel electrode.

7. The in-cell touch LCD device of claim 1, wherein the transparent the conductive line is configured to supply the common electrode with the common voltage during a display period and to supply the common electrode with a touch driving signal during a touch period.

* * * * *